(12) United States Patent
Pai

(10) Patent No.: US 7,411,316 B2
(45) Date of Patent: Aug. 12, 2008

(54) DUAL-INPUT POWER CONVERTER AND CONTROL METHODS THEREOF

(75) Inventor: Chung-Lung Pai, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 9 days.

(21) Appl. No.: 11/342,822

(22) Filed: Jan. 31, 2006

(65) Prior Publication Data

US 2006/0170400 A1    Aug. 3, 2006

(30) Foreign Application Priority Data

Feb. 3, 2005    (TW) ............................... 94103462 A

(51) Int. Cl.
   *H02M 3/16*    (2006.01)
   *H02M 1/08*    (2006.01)
   *H02J 1/00*    (2006.01)
(52) U.S. Cl. ........................................................ 307/81
(58) Field of Classification Search .................... 307/80
See application file for complete search history.

(56) References Cited

U.S. PATENT DOCUMENTS

| 6,246,220 | B1 * | 6/2001 | Isham et al. ................. 323/224 |
| 6,304,066 | B1 * | 10/2001 | Wilcox et al. ............... 323/282 |
| 6,597,157 | B1 * | 7/2003 | Boeckmann et al. ........ 323/242 |
| 6,621,256 | B2 * | 9/2003 | Muratov et al. ............. 323/282 |
| 6,714,426 | B1 * | 3/2004 | Guo et al. ...................... 363/25 |
| 6,906,433 | B2 * | 6/2005 | Nguyen ......................... 307/31 |
| 7,327,124 | B2 * | 2/2008 | Liu et al. ..................... 323/267 |
| 2005/0040797 | A1 * | 2/2005 | Sanchez De Castro et al. ... 323/271 |
| 2006/0040452 | A1 * | 2/2006 | Lotfi et al. ................... 438/305 |

* cited by examiner

*Primary Examiner*—Michael J Sherry
*Assistant Examiner*—Adi Amrany
(74) *Attorney, Agent, or Firm*—Rosenberg, Klein & Lee

(57) ABSTRACT

A dual-input power converter comprises two power stages using a common low-side element, a first input for coupling a first input voltage to the first power stage, a second input for coupling a second input voltage to the second power stage, and a controller for driving the first and second power stages to convert the first or second input voltage to an output voltage.

24 Claims, 16 Drawing Sheets

DUAL-INPUT POWER CONVERTER AND CONTROL METHODS THEREOF

FIELD OF THE INVENTION

The present invention relates generally to a power converter and, more particularly, to a dual-input power converter and control methods thereof.

BACKGROUND OF THE INVENTION

Generally, a switching-mode power converter converts an input voltage to an output voltage by alternatively switching a pair of high-side and low-side elements coupled with the input voltage. In a synchronous power converter, the high-side and low-side elements both are switches such as MOS transistors, and in an asynchronous power converter, the high-side and low-side elements are a switch and a diode, respectively. Additionally, power converters are classified into two types, boost converter and buck converter, depending on the way of producing the output voltage by boosting or bucking the input voltage.

In most portable electronic products, alkaline and lithium batteries are used for power source. However, the battery voltage gradually decays as it is used. To obtain a stable supply voltage, two-stage power converter is generally used to convert the battery voltage to the supply voltage in such a way that boosts the battery voltage to a higher voltage and then bucks it to the desired level.

Conversion efficiency is an important factor to evaluate the performance of a power converter. FIG. 1 shows a block diagram of a conventional two-stage power converter 100, which comprises a boost converter 102 and a buck converter 104 coupled in series. The input voltage Vin of the power converter 100 is provided by one lithium battery or two alkaline batteries, and in the power converter 100, the boost converter 102 steps up the input voltage Vin to produce a higher voltage Vout1, and then the buck converter 104 steps down the voltage Vout1 to produce the output voltage Vout2 at the desired level. However, either one of boost converter and buck converter typically has a conversion efficiency of about 90%, and thus a two-stage power converter will have a lower conversion efficiency not greater than 81%. As a result, the total conversion efficiency is lowed down after the two-stage power conversion.

Therefore, it is desired a high efficiency power converter.

SUMMARY OF THE INVENTION

An object of the present invention is to provide a dual-input power converter and control methods thereof.

Another object of the present invention is to provide a high efficiency power converter.

In a dual-input power converter for producing an output voltage, according to the present invention, two power stages use a common low-side element, and by a controller, the first power stage is driven to convert a first input voltage to the output voltage, or the second power stage is driven to convert a second input voltage to the output voltage. The controller may determine to drive the first or second power stage to produce the output voltage depending on the level of the first input voltage, the level of the output voltage, or the on-duty of the high-side element in the first power stage. Alternatively, the controller switches to drive the first and second power stages in turn to produce the output voltage. In the switching of the high-side elements and common low-side element in the first and second power stages, neither two of their on-duties will overlap.

By using two power stages having a common low-side element and a controller to select one of them to drive, a power converter may produce an output voltage by only one stage conversion, and the conversion efficiency thereof is improved significantly.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
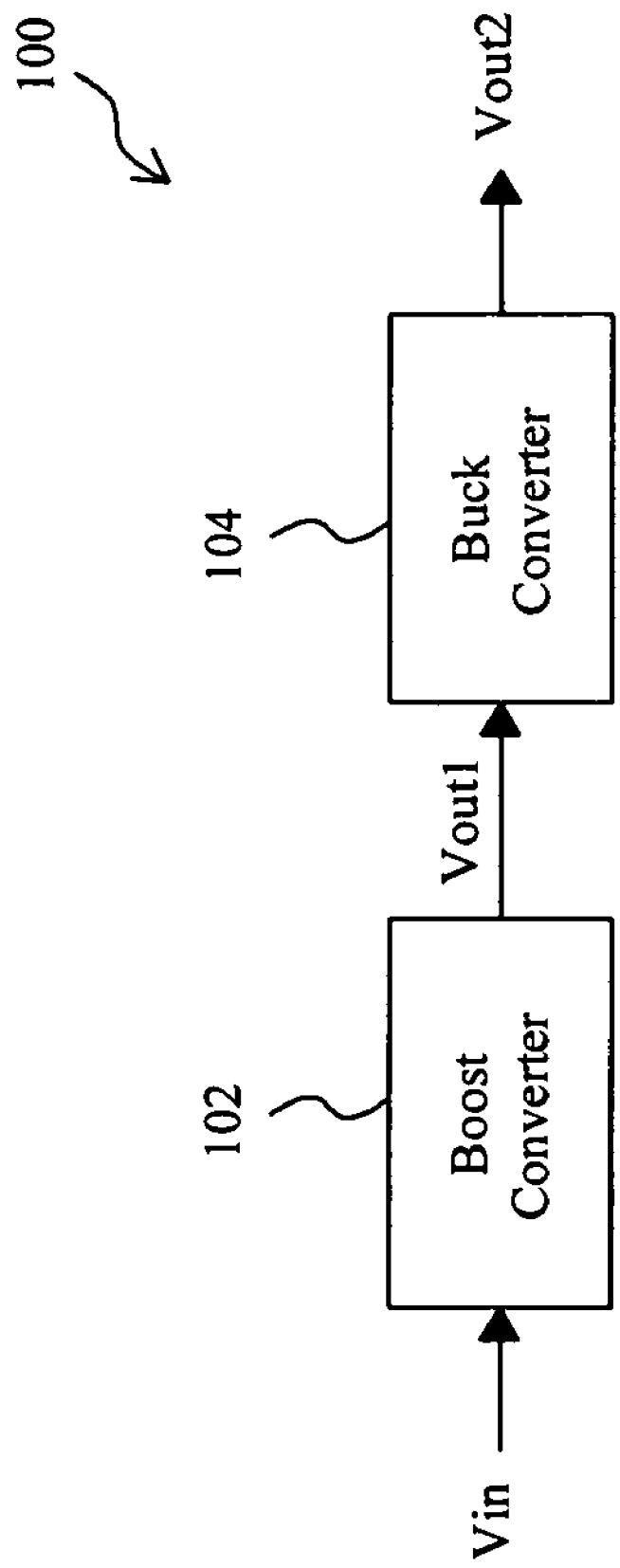
FIG. 1 shows a block diagram of a conventional two-stage power converter.
Figure 2:
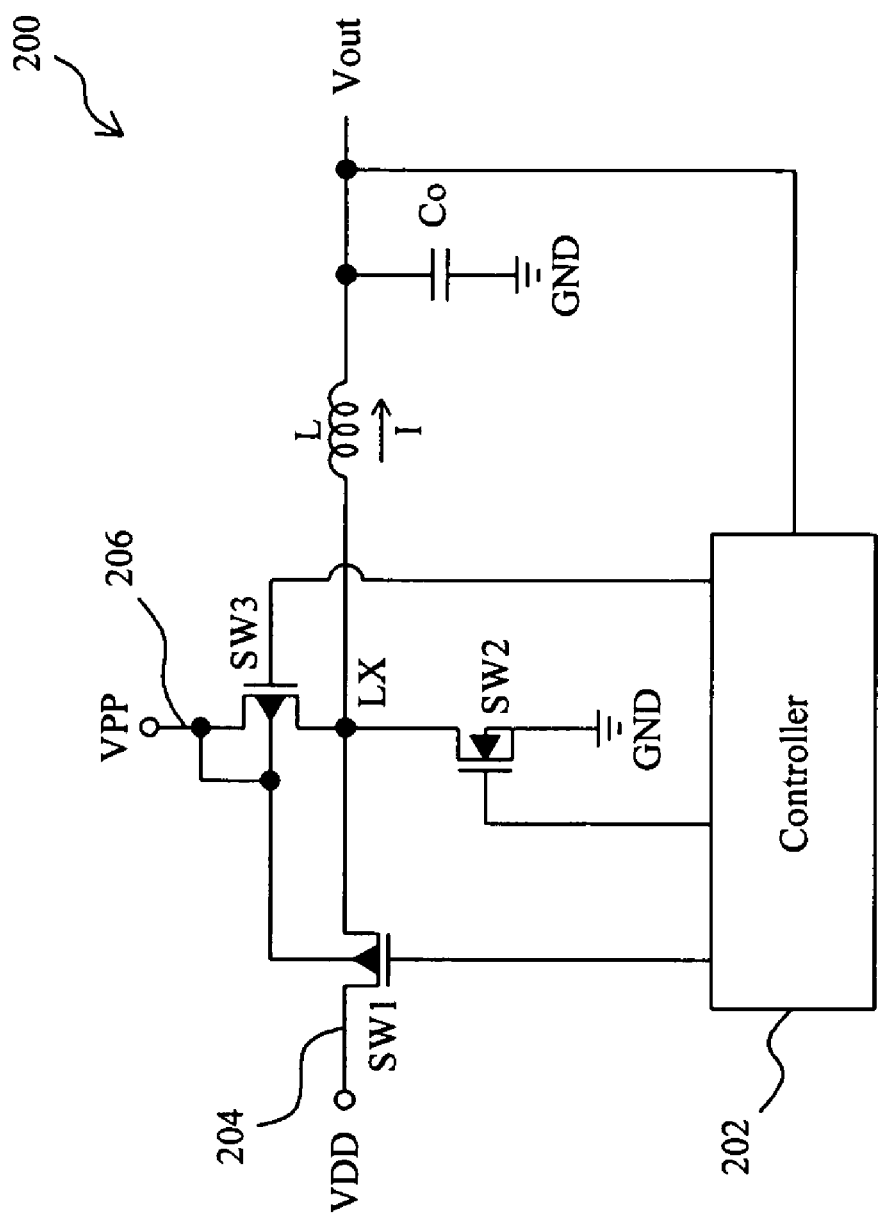
FIG. 2 shows a circuit diagram of a dual-input power converter according to the present invention.

As an embodiment of the present invention, FIG. 2 shows a circuit diagram of a dual-input power converter 200, which comprises two power stages and a controller 202 to drive thereto. The first power stage includes transistors SW1 and SW2, and the second power stage includes transistors SW3 and SW2. In particular, the transistor SW2 serves as a common low-side element of the two power stages and thereby, it behaves as a low-side element in association with the transistor SW1 for operating a first converter in some time and behaves as a low-side element in association with the transistor SW3 for operating a second converter in another time. Additionally, an inductor L and a capacitor Co also serve as common devices for constructing two converters. Namely, the transistors SW1 and SW2, inductor L, capacitor Co and controller 202 may constitute a first buck converter to convert a first input voltage VDD coupled to a first input 204 to the output voltage Vout, and the transistors SW3 and SW2, inductor L, capacitor Co and controller 202 may constitute a second buck converter to convert a second input voltage VPP coupled to a second input 204 to the output voltage Vout. If the controller 202 selects the first power stage to drive, the transistors SW1 and SW2 are alternatively switched to produce a current I flowing through the inductor L to charge the capacitor Co to produce the output voltage Vout. While the controller 202 selects the second power stage to drive, the transistors SW3 and SW2 are alternatively switched to produce a current I flowing through the inductor L to charge the capacitor Co to produce the output voltage Vout. In the power converter 200, the controller 202 may drive one or both of the two power stages to convert the input voltage VDD or VPP to the output voltage Vout. In switching the transistors SW1, SW2 and SW3, the on-duties of the transistors SW1 and SW2 do not overlap, the on-duties of the transistors SW3 and SW2 do not overlap, and the on-duties of the transistors SW1 and SW3 do not overlap. In an embodiment, the input voltage VPP is higher than the input voltage VDD, and the transistors SW1 and SW3 both are PMOS whose substrates are coupled with the input voltage VPP to prevent from reverse currents caused by body diodes thereof.

Figure 3:
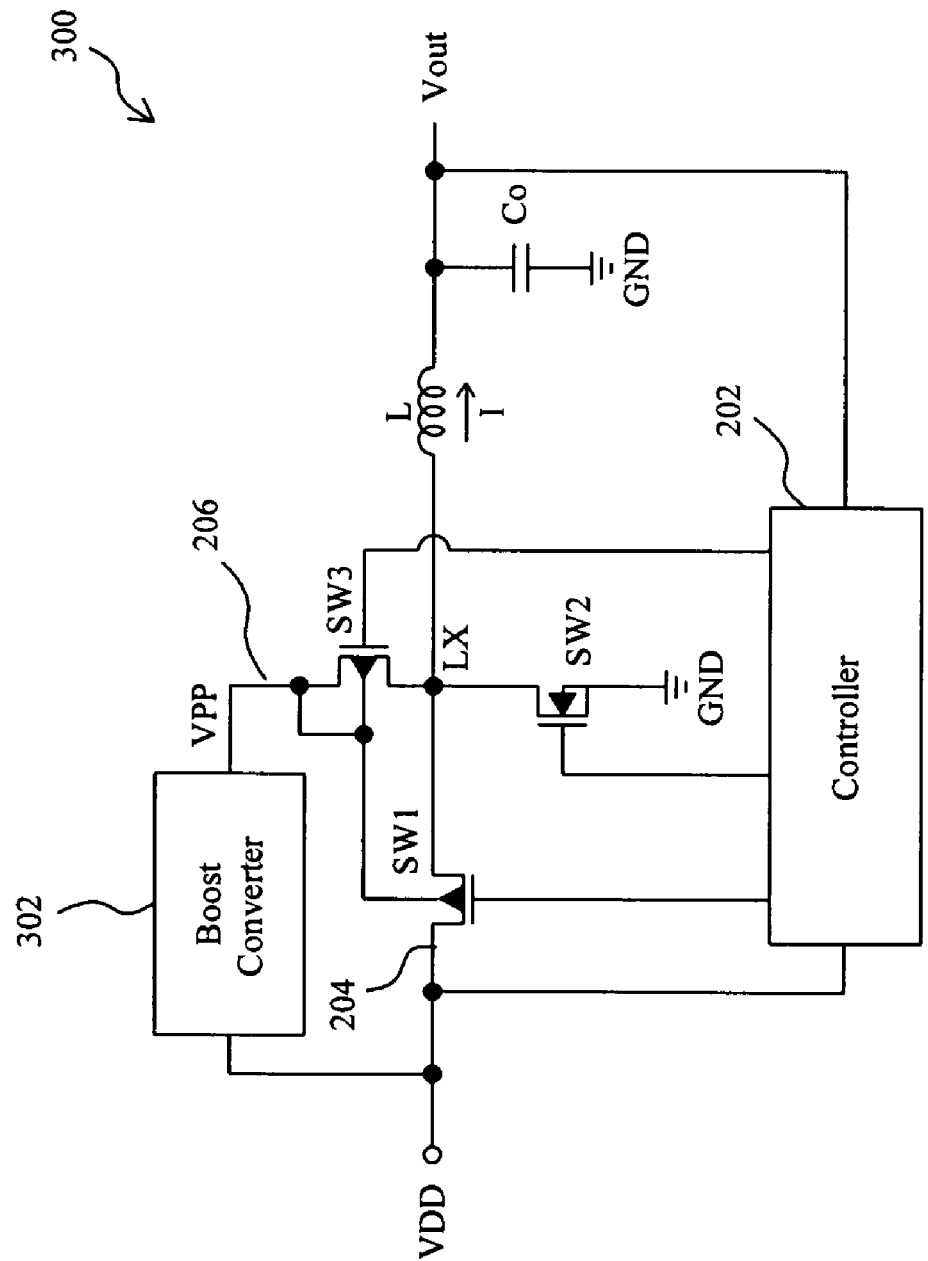
FIG. 3 shows an exemplary circuit to illustrate an application of the power converter of FIG. 2 in a battery system.

FIG. 3 shows an exemplary circuit to illustrate an application of the power converter 200 in a battery system. In FIG. 3, the first input voltage VDD of a dual-input power converter 300 is supplied by battery or batteries, and a boost converter 302 is coupled between the inputs 204 and 206 to convert the first input voltage VDD to the second input voltage VPP. When operating the buck converter constituted by the transistors SW1 and SW2, inductor L, capacitor Co and controller 202, the power converter 300 is exactly a single-stage buck converter. In an embodiment, the controller 202 detects the first input voltage VDD to determine which one of the two power stages is to be driven. If the first input voltage VDD is higher than a threshold, the controller 202 drives the first power stage composed of the transistors SW1 and SW2 to convert the first input voltage VDD to the output voltage Vout, and at this time the power converter 300 is operated as a single-stage buck converter. On the contrary, when the first input voltage VDD is lower than the threshold, the controller 202 turns off the transistor SW1 and the boost converter 302 converts the first input voltage VDD to produce the second input voltage VPP to supply to the second input 206 such that the controller 202 may drive the second power stage composed of the transistors SW3 and SW2 to convert the second input voltage VPP to the output voltage Vout. At this time, the transistors SW3 and SW2, inductor L, capacitor Co and controller 202 constitutes a second buck converter, and the power converter 300 is exactly a two-stage power converter that boosts the first input voltage VDD to the second input voltage VPP and then bucks the second input voltage VPP the output voltage Vout.

Figure 4:
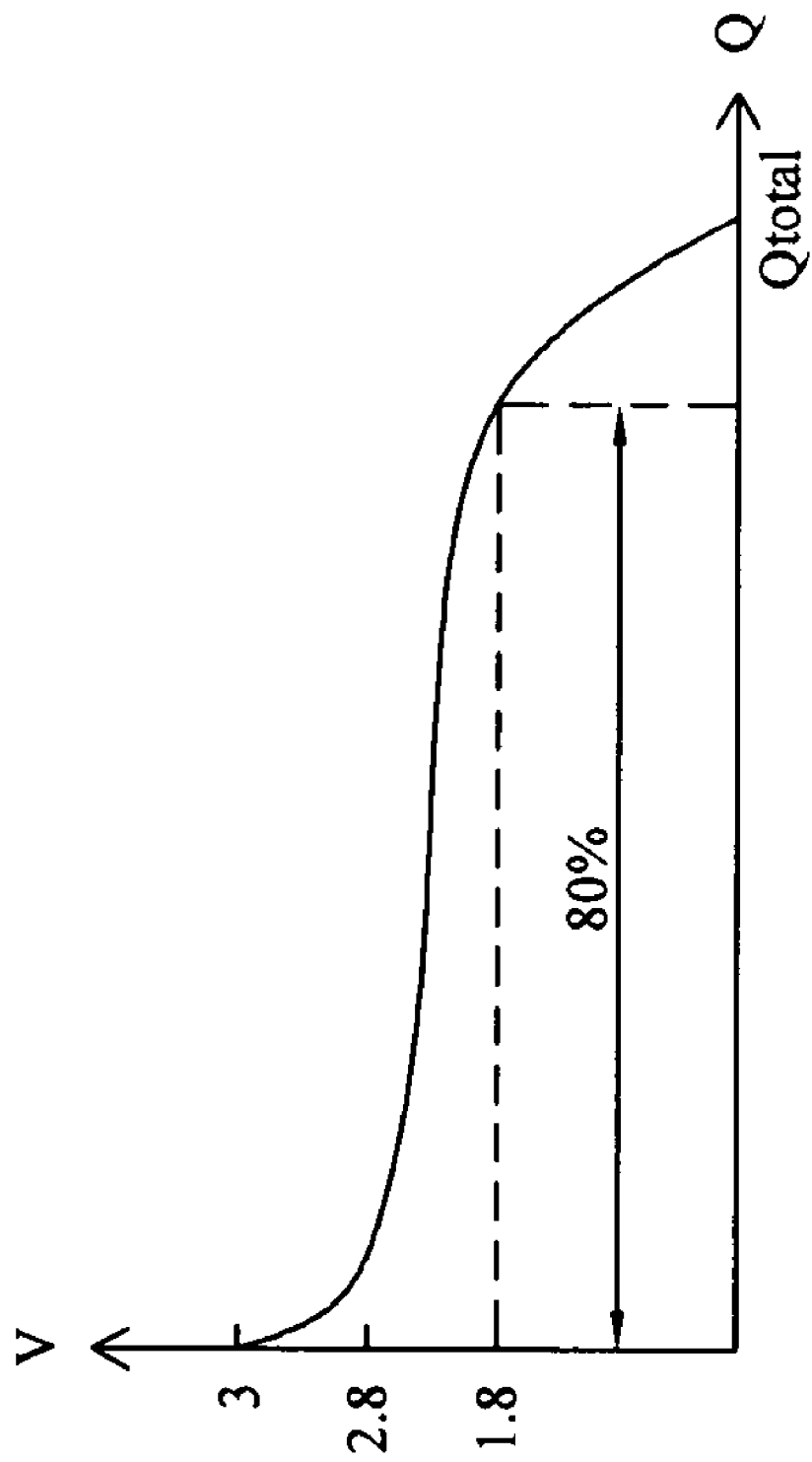
FIG. 4 shows a diagram of the relationship between the supplied voltage and output power of two alkaline batteries in series.

For an example, assuming that the input voltage VDD is supplied by two alkaline batteries in series, the desired output voltage Vout is 1.8 volts, and a threshold of 1.8 volts is preset for the first input voltage VDD, FIG. 4 shows a diagram of the relationship between the supplied voltage VDD and output power Q of the two batteries. As shown by the curve in FIG. 4, before the supplied voltage of the two batteries decays down to 1.8 volts, the two batteries could supply 80% of the total stored energy. Since the power converter 300 is a single-stage buck converter before the first input voltage VDD becomes lower than the threshold of 1.8 volts, the conversion efficiency is about 90%, and the energy that could be provided by the power converter 300 during this time period is $$Q1 = 80\% \times Q_{total} \times 90\% = 72\% \times Q_{total},\quad [\text{EQ-1}]$$

where $Q_{total}$ is the total energy of the two batteries. After the first input voltage VDD is lower than the threshold of 1.8 volts, the power converter 300 is switched to a two-stage power converter, which has a conversion efficiency of about 81%. Hence, the energy that could be provided by the power converter 300 during this time period is $$Q2 = 20\% \times Q_{total} \times 81\% = 16.2\% \times Q_{total}.\quad [\text{EQ-2}]$$

From the equations EQ-1 and EQ-2, the power converter 300 has the effective conversion efficiency $$(72\% \times Q_{total} + 16.2\% \times Q_{total})/Q_{total} = 88.2\%,\quad [\text{EQ-3}]$$

which is much better than that of a conventional two-stage power converter.

Figure 5:
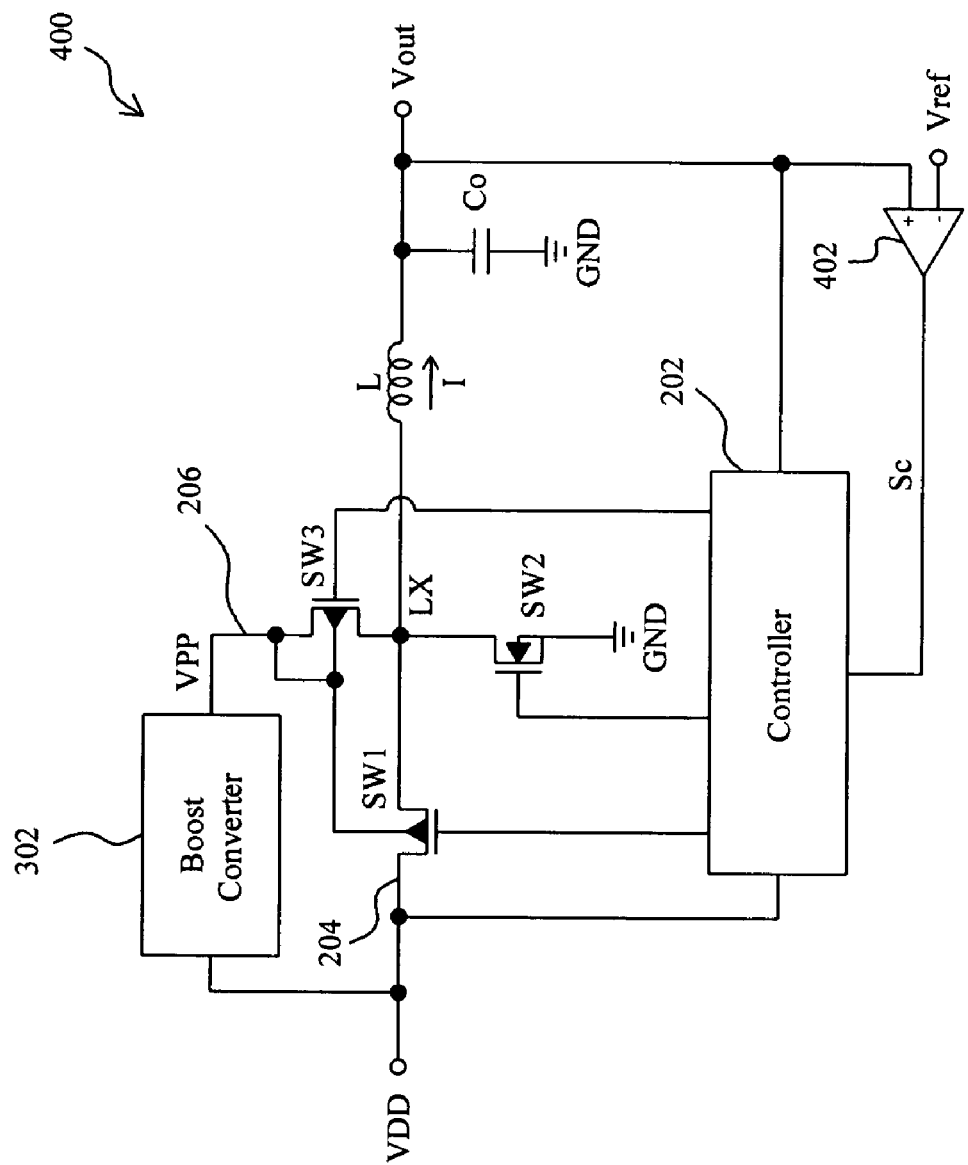
FIG. 5 shows another exemplary circuit to illustrate an application of the power converter of FIG. 2 in a battery system.

FIG. 5 shows another exemplary circuit to illustrate an application of the power converter 200 in a battery system. In FIG. 5, a dual-input power converter 400 is configured as that of the power converter 300 shown in FIG. 3, only that an error amplifier 402 is added to compare the output voltage Vout with a reference voltage Vref for generating a signal Sc for the controller 202. When the controller 202 drives the first power stage composed of the transistors SW1 and SW2, the power converter 400 is exactly a single-stage buck converter, which has a conversion efficiency of 90%. After the battery or batteries are used for a long time such that the battery voltage VDD supplied for the power converter 400 decays to a level not sufficient to maintain the output voltage Vout higher than the reference voltage Vref, the error amplifier 402 will signal the controller 202 by the signal Sc to turn off the transistor SW1, and the power converter 400 is switched to a two-stage converter, which boosts the first input voltage VDD to the second input voltage VPP by the boost converter 302 and then bucks the second input voltage VPP to the output voltage Vout by the second power stage composed of the transistors SW3 and SW2.

Likewise, it is assumed for the power converter 400 that the input voltage VDD is supplied by two alkaline batteries in series, the desired output voltage Vout is 1.8 volts, and a threshold of 1.75 volts is preset for the output voltage Vout. Since the transistors SW1 and SW2, inductor L, capacitor Co and controller 202 constitute a single-stage buck converter, the output voltage Vout will decrease after the battery voltage VDD decays to a level lower than 1.8 volts. Also shown by the curve in FIG. 4, before the first input voltage VDD decays to lower than 1.8 volts, the power converter 400 could provide the energy as described by the equation EQ-1. After the output voltage Vout is lower than 1.75 volts, which will occur when the first input voltage VDD is lower than 1.8 volts or less, the power converter 400 provides the energy as described by the equation EQ-2. Therefore, as described by the equation EQ-3, the power converter 400 also has a conversion efficiency of about 88.2%, which is much better than that of a conventional two-stage power converter.

Figure 6:
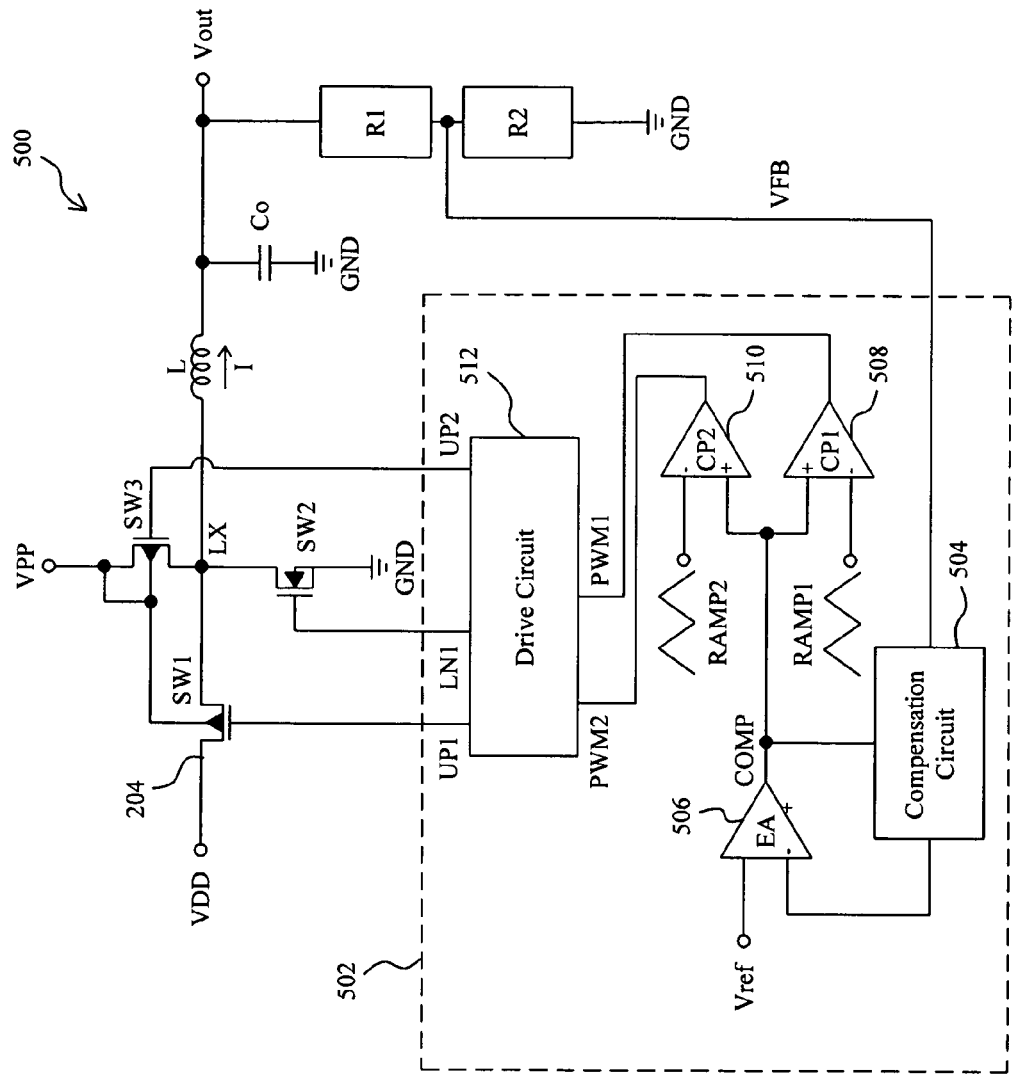
FIG. 6 is a circuit diagram to illustrate another control method for the power converter of FIG. 2.

FIG. 6 is designed to illustrate another control method for the power converter 200. In a dual-input power converter 500, two resistors R1 and R2 are coupled in series between the output voltage Vout and ground GND to divide the output voltage Vout to produce a feedback signal VFB for a controller 502. In the controller 502, the feedback signal VFB is compensated by a compensation circuit 504 and then coupled to an error amplifier 502 to be compared with a referent voltage Vref to determine an error signal COMP. A comparator 508 compares the error signal COMP with a signal RAMP1 to produce a pulse width modulation (PWM) signal PWM1, a comparator 510 compares the error signal COMP with a signal RAMP2 to produce a PWM signal PWM2, and a drive circuit 512 switches the transistors SW1, SW2 and SW3 in response to the PWM signals PWM1 and PWM2 to convert the first input voltage VDD or the second input voltage VPP to the output voltage Vout. The drive circuit 512 includes a logical operation circuit to determine control signals UP1, UP2 and LN1 upon the PWM signals PWM1 and PWM2 to switch the transistors SW1, SW2 and SW3 such that neither two of the on-duties of the transistors SW1, SW2 and SW3 will not overlap.

Figure 7:
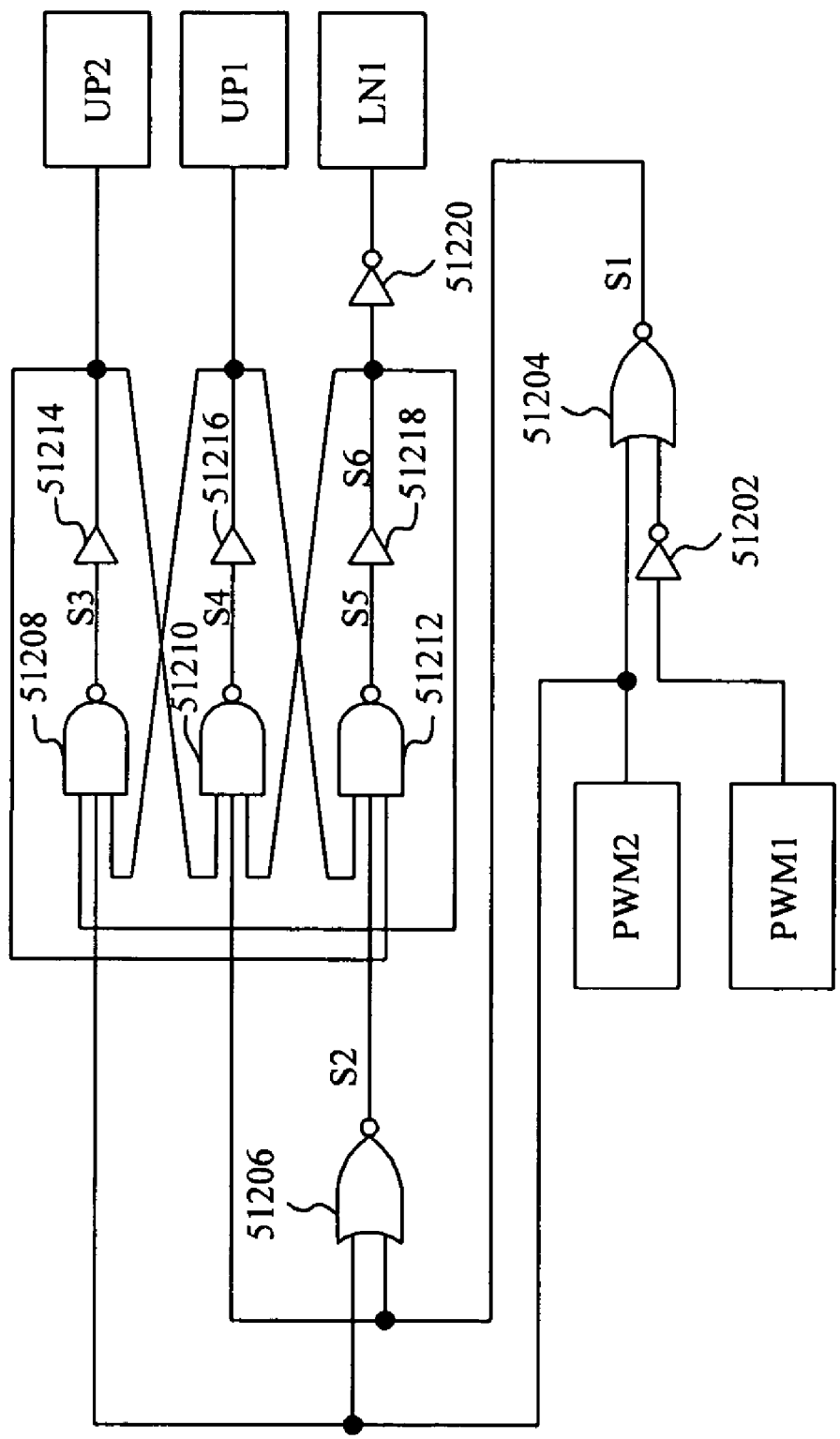
FIG. 7 shows an exemplary circuit for the drive circuit in FIG. 6.

FIG. 7 shows an exemplary circuit for the drive circuit 512 in FIG. 6, in which the PWM signal PWM1 is inverted by an inverter 51202 and then coupled to a NOR gate 51204, the PWM signal PWM2 is coupled to the NOR gate 51204, the NOR gate 51204 produces a signal S1, a NOR gate 51206 produces a signal S2 upon the signal S1 and PWM signal PWM2, a NAND gate 51208 produces a signal S3 upon the control signal UP1, a signal S6 and the signal PWM2 to produce the control signal UP2 via a driver 51214, a NAND gate 51210 produces a signal S4 upon the control signal UP2, signals S6 and S1 to produce the control signal UP1 via a driver 51216, and a NAND 51212 produces a signal S5 upon the control signals UP1 and UP2 and the signal S2 to produce the control signal LN1 via a driver 51218 and an inverter 51220.

Figure 8A:
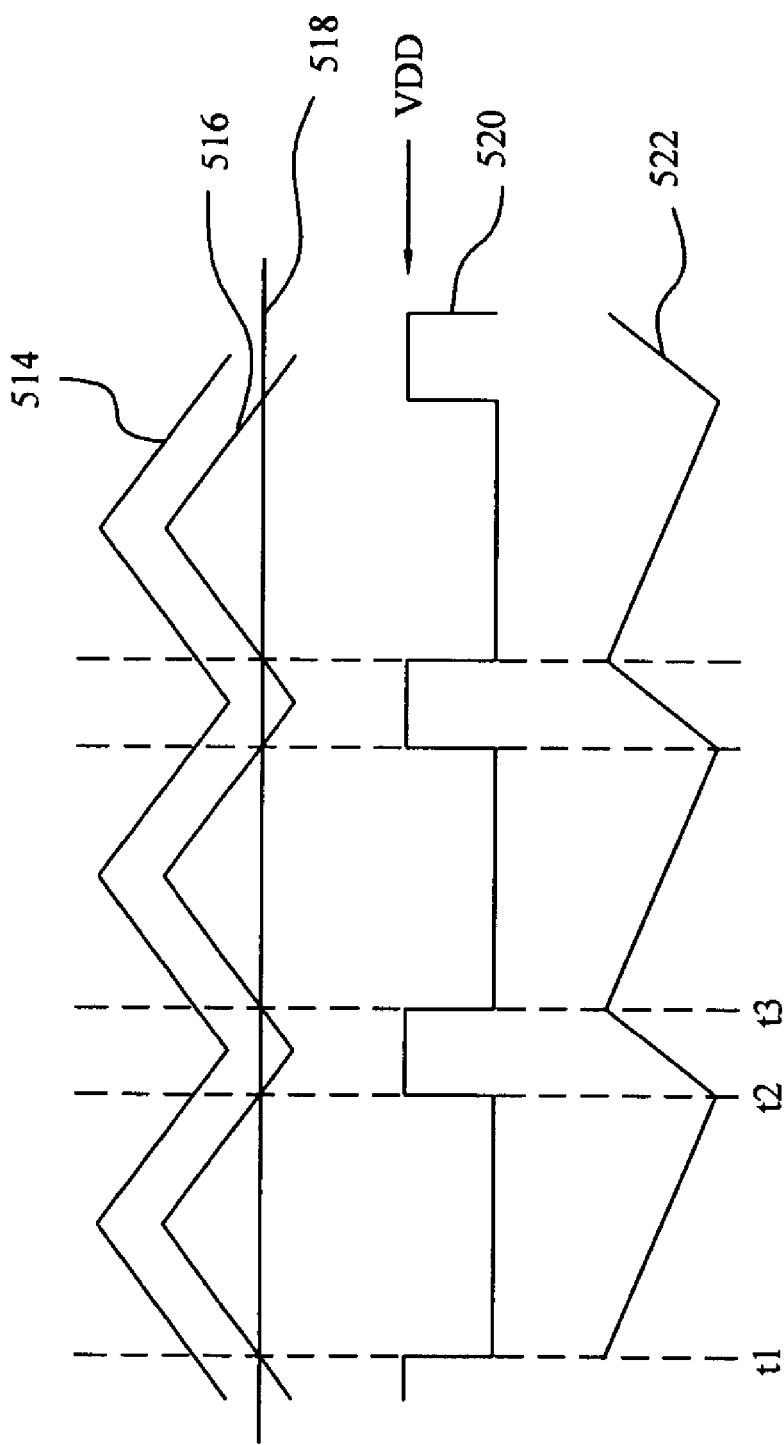
FIG. 8A shows a waveform diagram of various signals in the circuit of FIG. 6 when the first input voltage is higher than the output voltage.
Figure 8B:
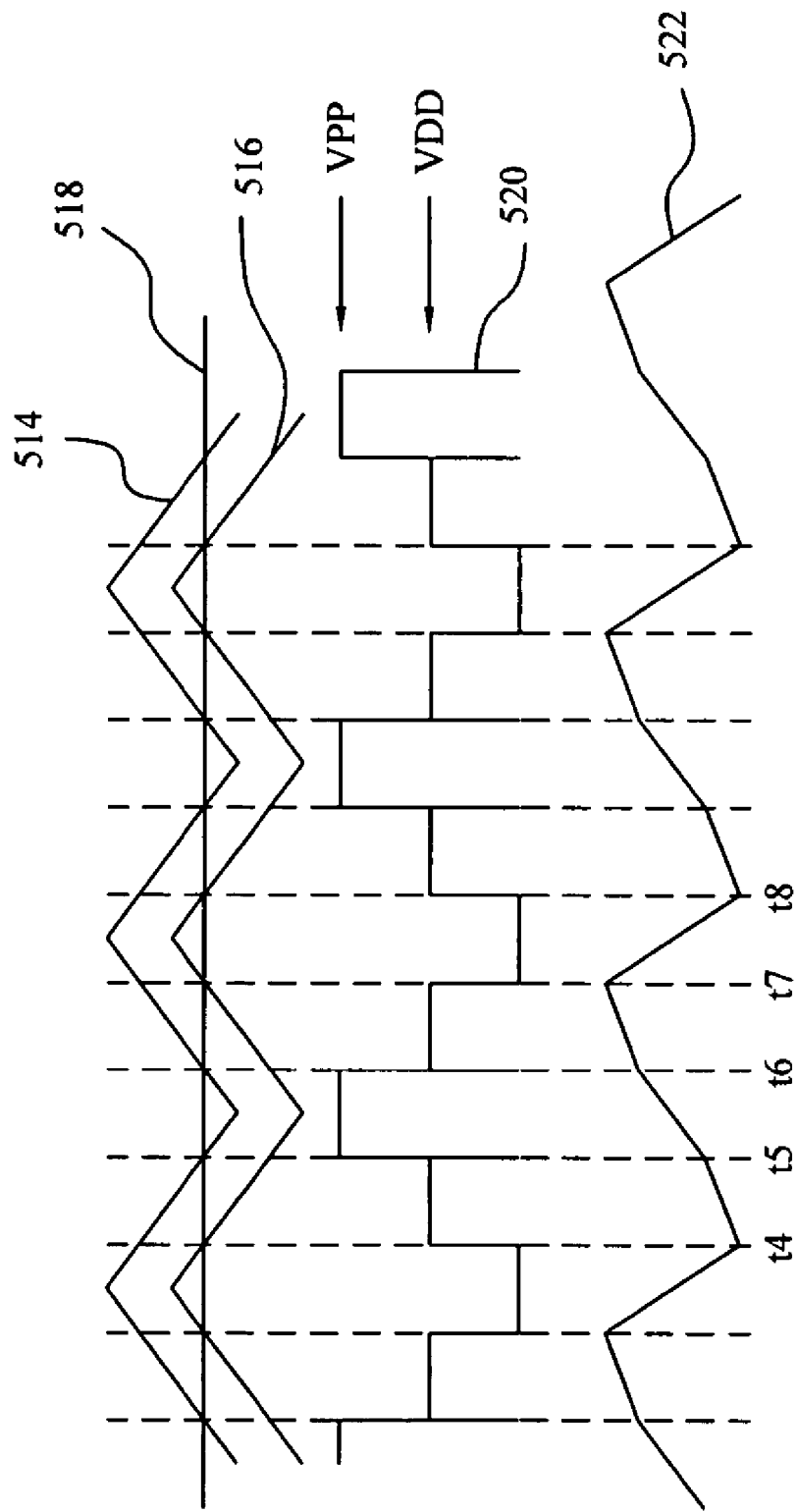
FIG. 8B shows a waveform diagram of various signals in the circuit of FIG. 6 when the first input voltage is likely equal to the output voltage.
Figure 8C:
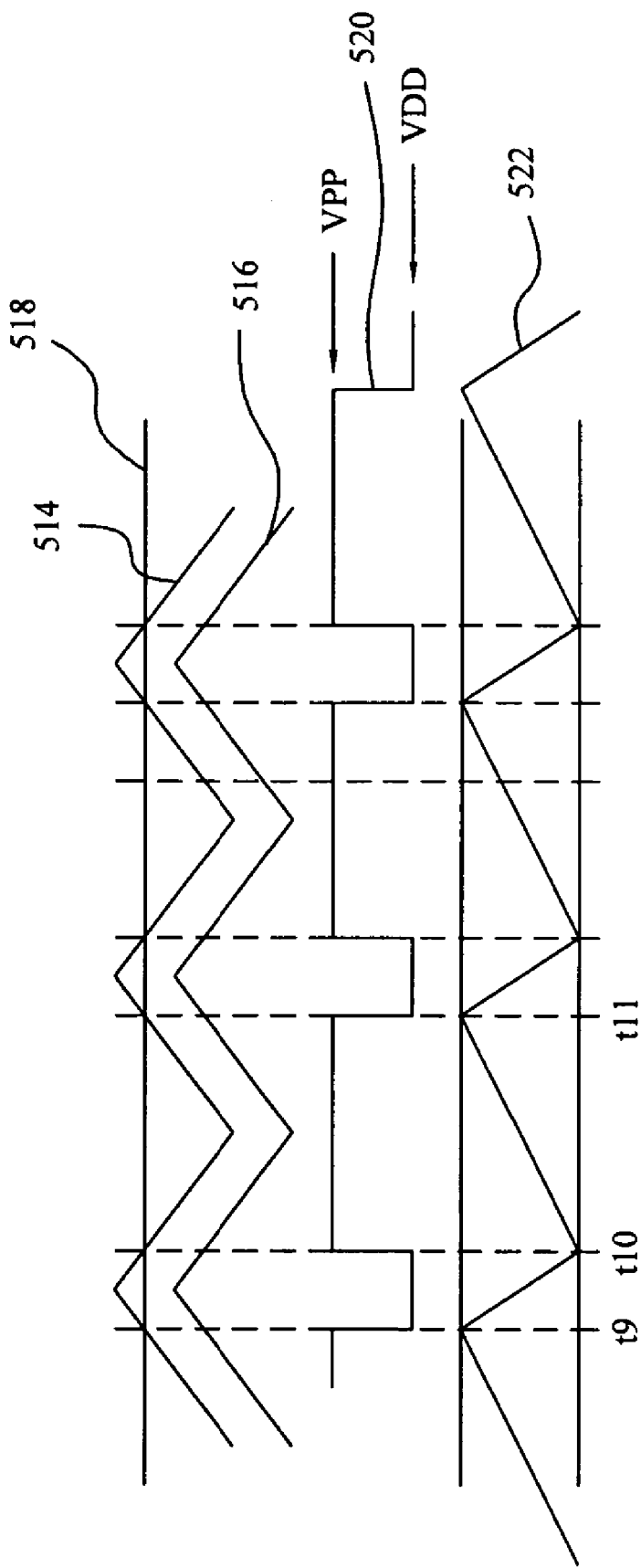
FIG. 8C shows a waveform diagram of various signals in the circuit of FIG. 6 when the first input voltage is lower than the output voltage.

FIG. 8A shows a waveform diagram of the signals RAMP1 and RAMP2, error signal COMP, voltage on the phase node LX and current I in the circuit of FIG. 6 when the first input voltage VDD is higher than the output voltage Vout, FIG. 8B shows a waveform diagram of those signals when the first input voltage VDD is likely equal to the output voltage Vout, and FIG. 8C shows a waveform diagram of those signals when the first input voltage VDD is lower than the output voltage Vout, in which waveform 514 represents the signal RAMP2, waveform 516 represents the signal RAMP1, waveform 518 represents the error signal COMP, waveform 520 represents the voltage on the phase node LX, and waveform 522 represents the current I.

Referring to FIG. 6, FIG. 7 and FIG. 8A, when the first input voltage VDD is higher than the output voltage Vout, the signals RAMP1 and RAMP2 both are greater than the error signal COMP during the time duration from time t1 to time t2, the PWM signals PWM1 and PWM2 both are at low level accordingly, and therefore the control signals UP1, UP2 and LN1 are all at high level. As a result, the transistors SW1 and SW3 turn off and the transistor SW2 turns on, since the transistors SW1 and SW3 are PMOS and the transistor SW2 is NMOS. Hence, the phase node LX is substantially grounded, and the current I decreases. From time t2 to time t3, the signal RAMP1 is less than the error signal COMP but the signal RAMP2 is still greater than the error signal COMP, so that the PWM signal PWM1 is at high level and the PWM signal RMP2 is at low level. Accordingly, the control signal UP2 is at high level and the control signals UP1 and LN1 both are at low level. Thereby, the transistors SW2 and SW3 turn off and the transistor SW1 turns on. Hence, the voltage on the phase node LX substantially equals to the first input voltage VDD, and the current I increase.

As the first input voltage VDD decays, the error signal COMP increases gradually. When the first input voltage VDD is likely to reach the output voltage Vout, referring to FIG. 6, FIG. 7 and FIG. 8B, during the time duration from time t4 to time t5, the signal RAMP1 is less than the error signal COMP and the signal RAMP2 is greater than the error signal COMP, the PWM signal PWM1 is at high level and the PWM signal RMP2 is at low level accordingly, and thereby the control signal UP2 is at high level and the control signals UP1 and LN1 both are at low level. As a result, the transistors SW2 and SW3 turn off and the transistor SW1 turns on. Hence, the voltage on the phase node LX substantially equals to the first input voltage VDD, and the current I increases. From time t5 to time t6, the signals RAMP1 and RAMP2 both are less than the error signal COMP, resulting in the control signal UP1 at high level and the control signals UP2 and LN1 at low level. Accordingly, the transistors SW1 and SW2 turn off and the transistor SW3 turns on, and the voltage on the phase node LX substantially equals to the second input voltage VPP and the current I increases faster. From time t6 to time t7, the signal RAMP1 is still less than the error signal COMP but the signal RAMP2 is greater than the error signal COMP, resulting in the PWM signal PWM1 at high level and the PWM signal PWM2 at low level, so that the control signal UP2 is at high level and the control signals UP1 and LN1 both are at low level. As a result, the transistors SW2 and SW3 turn off and the transistor SW1 turns on. Therefore, the voltage on the phase node LX substantially equals to the first input voltage VDD and the current I increases slower. From time t7 to time t8, the signals RAMP1 and RAMP2 both are greater than the error signal COMP, causing the PWM signals PWM1 and PWM2 both at low level, and the control signals UP1, UP2 and LN1 all at high level. As a result, the transistors SW1 and SW3 turn off and the transistor SW2 turns, thereby substantially grounding the phase node LX and decreasing the current I.

As the first input voltage VDD further decreases, the error signal COMP increases continuously. After the first input voltage VDD is lower than the output voltage Vout, referring to FIG. 6, FIG. 7 and FIG. 8C, during the time duration from time t9 to time t10, the signal RAMP1 is less than the error signal COMP and the signal RAMP2 is greater than the error signal COMP, causing the PWM signal PWM1 at high level and the PWM signal RMP2 at low level, thereby producing the control signal UP2 at high level and the control signals UP1 and LN1 at low level. Thus, the transistors SW2 and SW3 turn off and the transistor SW1 turns on, and hence, the voltage on the phase node LX substantially equals to the first input voltage VDD, and the current I increases. From time t10 to time t11, the signals RAMP1 and RMP2 both are less than the error signal COMP, resulting in the PWM signals PWM1 and PWM2 at high level to produce the control signal UP1 at high level and the control signals UP2 and LN1 at low level. Therefore, the transistors SW1 and SW2 turn off and the transistor SW3 turns on, so that the voltage on the phase node LX substantially equals to the first input voltage VPP and the current I increases.

Figure 9A:
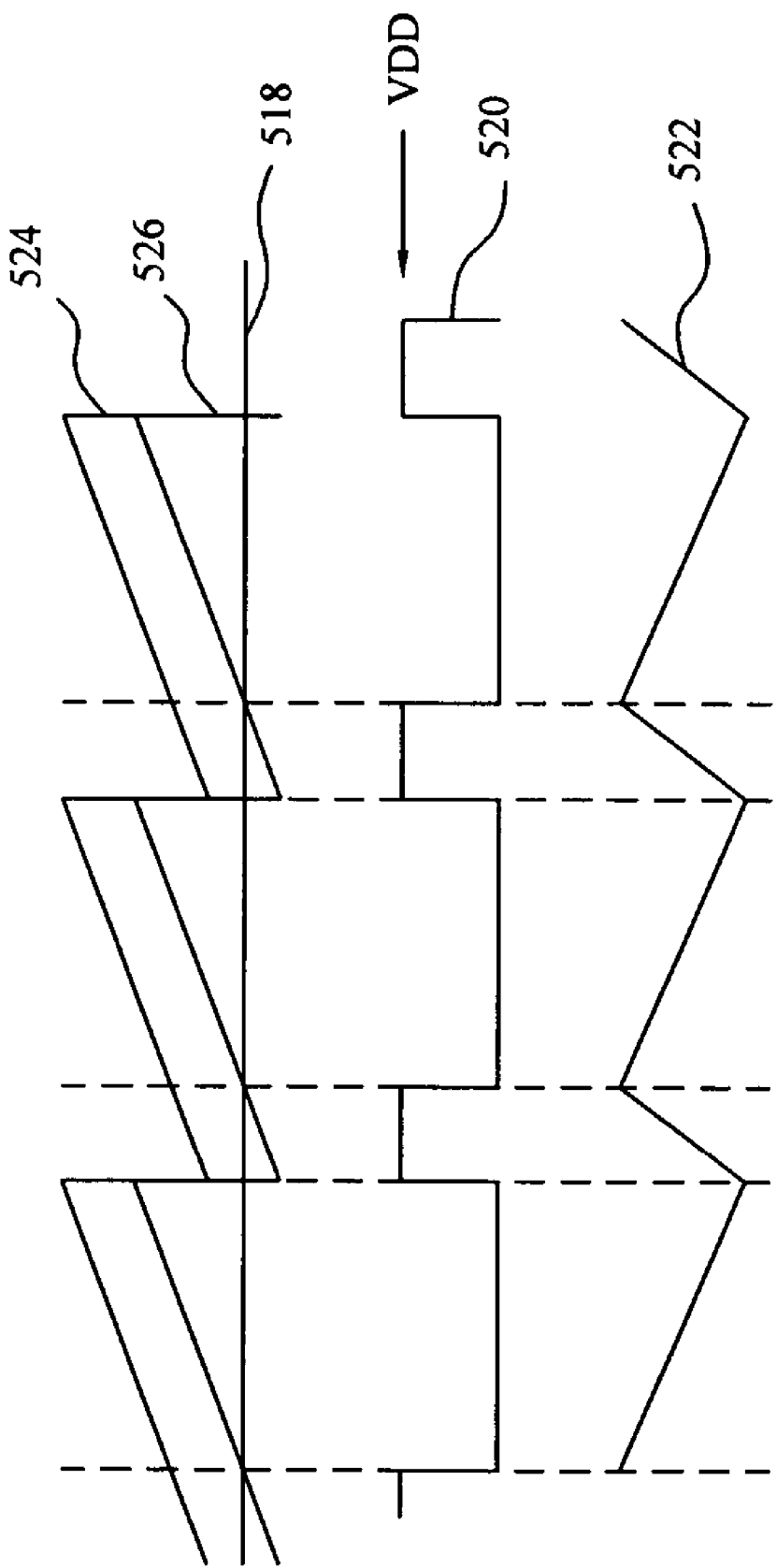
FIGS. 9A, 9B and 9C show waveform diagrams of the various signals in the circuit of FIG. 6 in an embodiment.
Figure 9B:
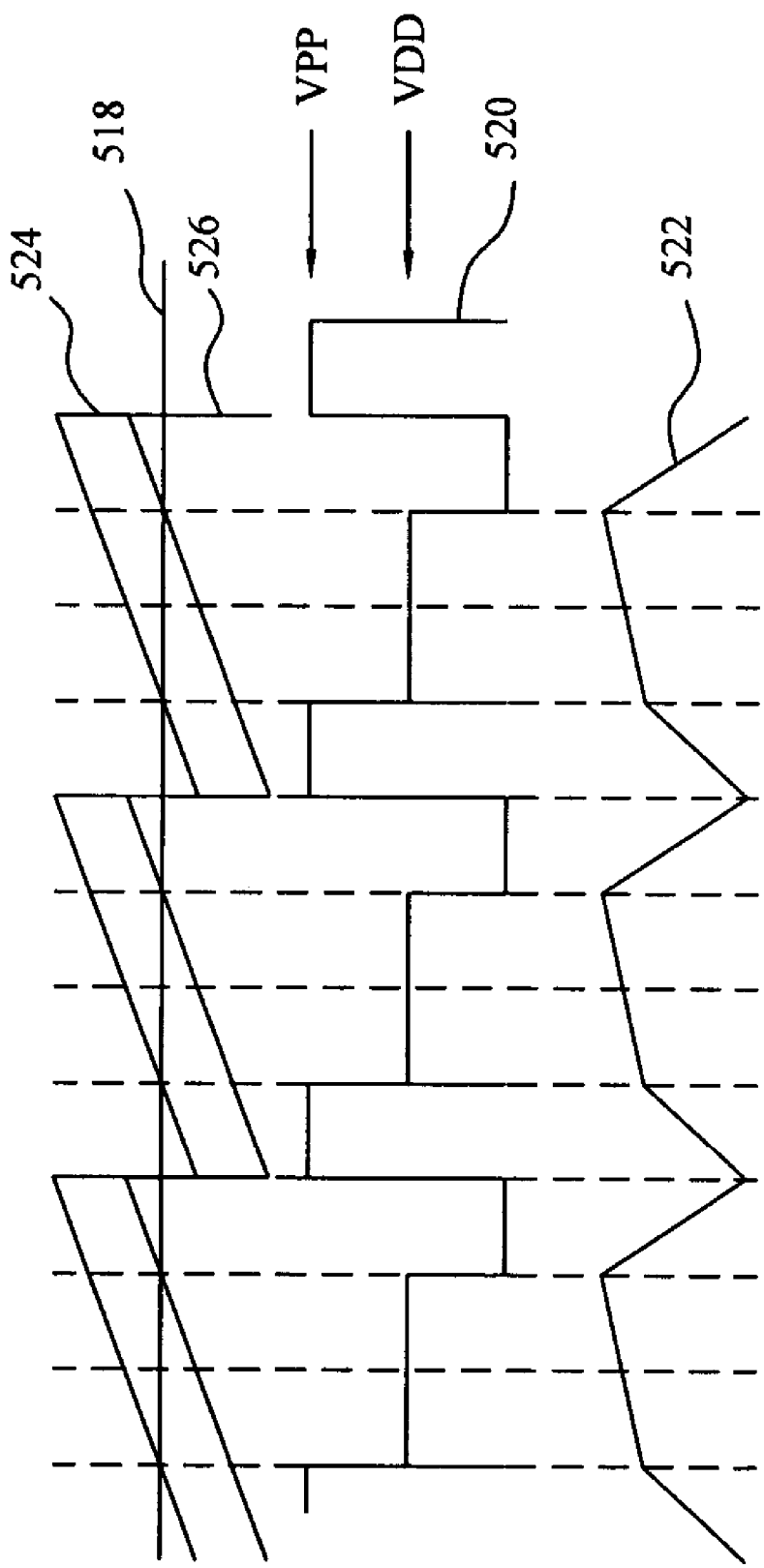
Figure 9C:
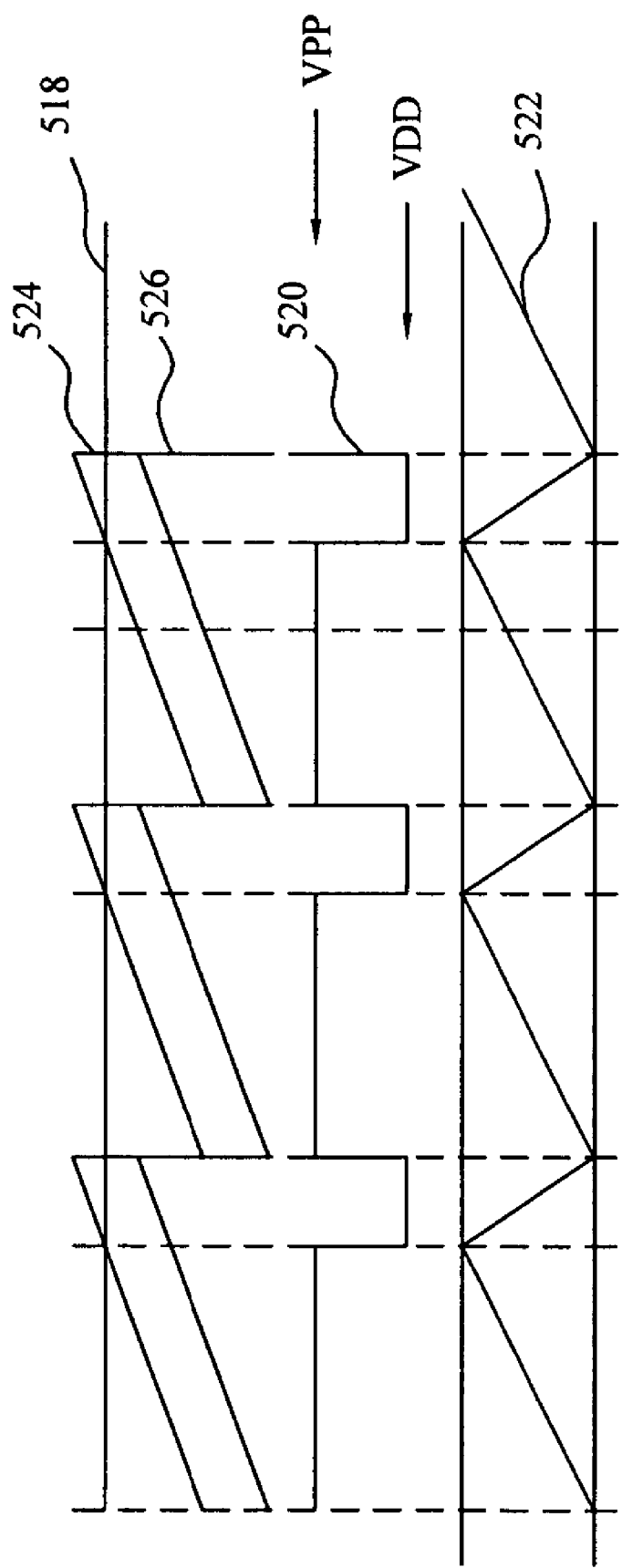

In the embodiment shown in FIGS. 8A, 8B and 8C, triangular waves are provided for the signals RAMP1 and RAMP2; while in other embodiments, the signals RAMP1 and RAMP2 may be provided with other waveforms such as of saw-tooth, as shown by waveforms 524 and 526 in FIGS. 9A, 9B and 9C, operated in the similar way as in the foregoing description.

Figure 10:
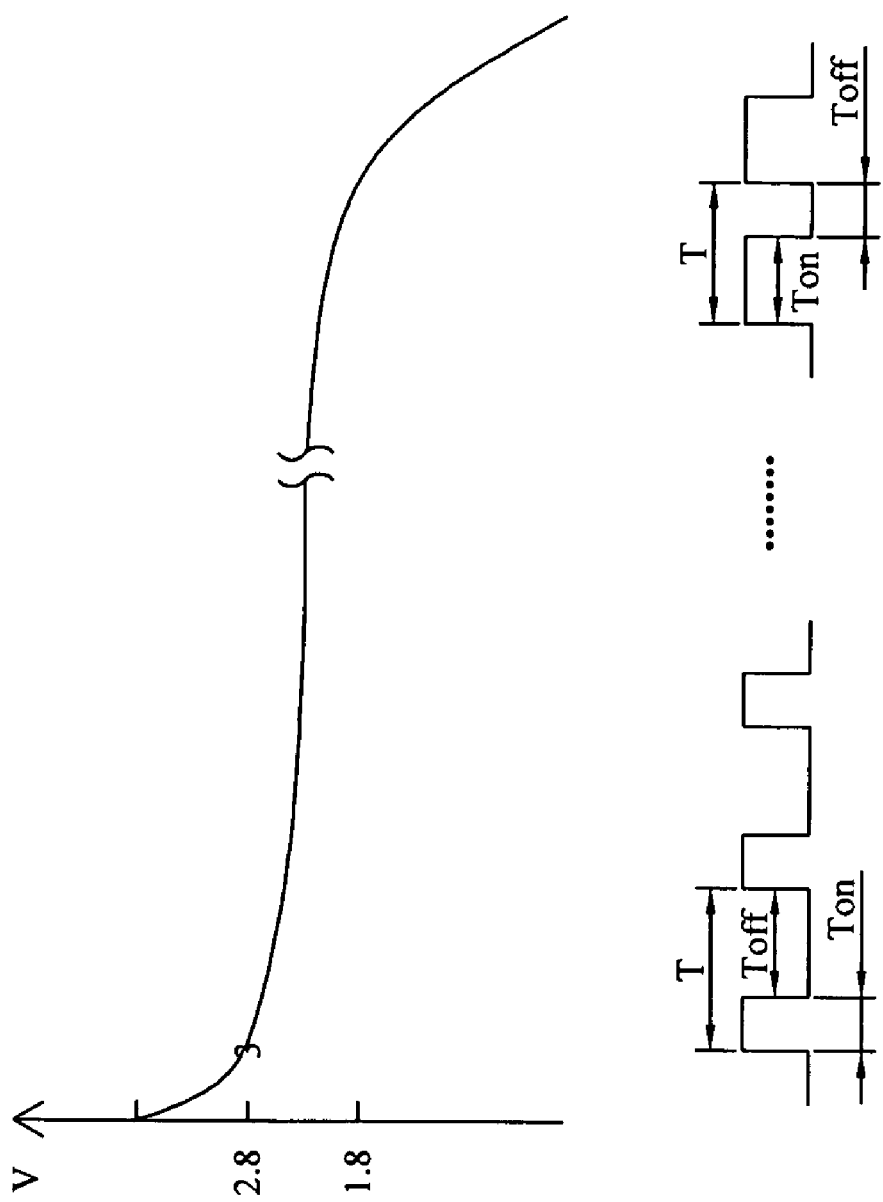
FIG. 10 shows a diagram to illustrate a control method for operating a dual-input power converter of the present invention by detecting the on-duty of the high-side transistor SW1.
Figure 11:
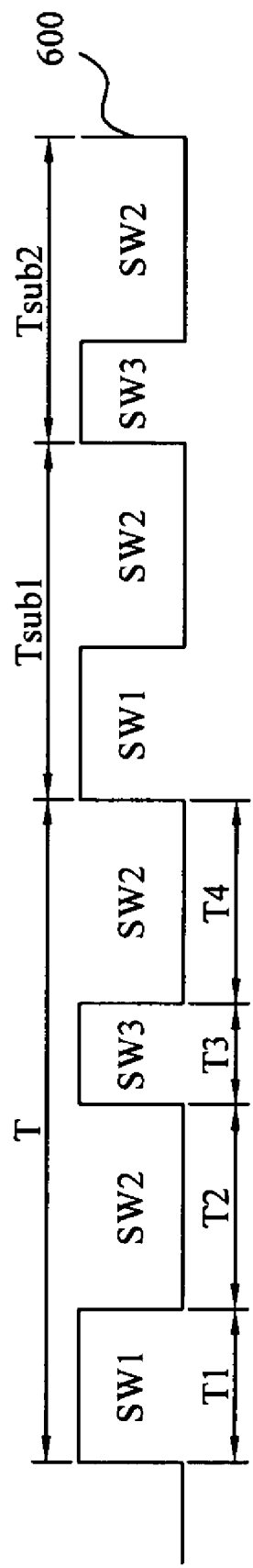
FIG. 11 shows a clock for a control method for operating a dual-input power converter of the present invention.

More control methods may be provided. As shown in FIG. 10 for example, since the on-duty Ton of the transistor SW1 will increase as the first input voltage VDD decreases, the on-duty Ton of the transistor SW1 is detected to determine to switch between the two power stages. In an embodiment, if the on-duty Ton of the transistor SW1 increases to reach or become greater than a preset threshold such as 80% of the period T of the clock once or more times, the transistor SW1 turns off, and the second power stage begins to be driven to convert the second input voltage VPP to the output voltage Vout. In a further embodiment, as shown in FIG. 11, the period T of the clock is segmented into two time intervals Tsub1 and Tsub2 such that the two power stages are driven in turn periodically. Namely, the first buck converter including the transistors SW1 and SW2, inductor L and capacitor Co is operated during the first time interval Tsub1, and the second buck converter including the transistors SW3 and SW2, inductor L and capacitor Co is operated during the second time interval Tsub2. In further detail, the first time interval Tsub1 includes an on-time T1 for the transistor SW1 to turn on and an off-time T2 for the transistor SW2 to turn on, and the second time interval Tsub2 includes an on-time T3 for the transistor SW3 to turn on and an off-time T4 for the transistor SW2 to turn on. Therefore, the first and second buck converters alternatively convert the first and second input voltages VDD and VPP to the output voltage Vout.

Figure 12:
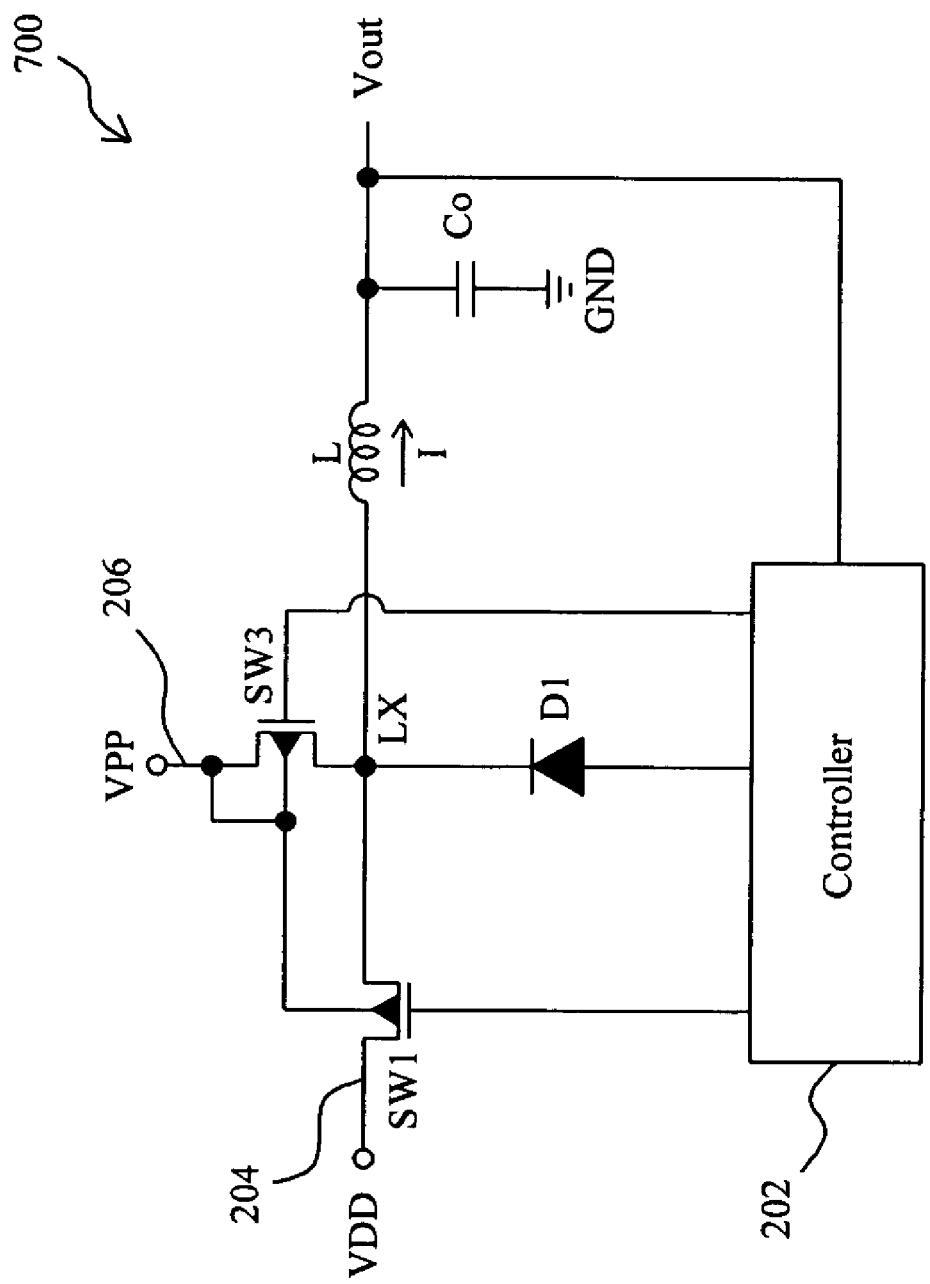
FIG. 12 shows a circuit diagram of an asynchronous power converter according to the present invention.

In asynchronous power converter, the transistor SW2 shown in the above embodiments is replaced by a current directing element such as a diode, and FIG. 12 shows an embodiment 700 for such apparatus. The dual-input power converter 700 comprises a first power stage composed of the transistor SW1 and a diode D1 and a second power stage composed of the transistor SW3 and diode D1. The controller 202 may switch to drive the transistor SW1 to convert the first input voltage VDD to the output voltage Vout or to drive the transistor SW3 to convert the second input voltage VPP to the output voltage Vout. In the operation of the power converter 700, the on-duties of the transistors SW1 and SW3 will not overlap to each other. Similarly, the control methods shown in the above embodiments are also applicable to the power converter 700.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A dual-input power converter for producing an output voltage, comprising:
    a first input coupled to a first input voltage;
    a second input coupled to a second input voltage, the second input voltage having of a different magnitude than the first input voltage;
    a common low-side switch coupled to a common reference for the first and second input voltages;
    a first high-side switch coupled between the first input and the common low-side switch such that the first high-side switch and the common low-side switch serve as a first power stage;
    a second high-side switch coupled between the second input and the common low-side switch such that the second high-side switch and the common low-side switch serve as a second power stage; and
    a controller coupled to the common low-side switch, the first high-side switch, and the second high-side switch for controlling the driving of the first and second power stages to respectively convert the first or second input voltage to the output voltage, the controller driving the common low-side switch, the first high-side switch, and the second high-side switch such that none of their on-duty cycles overlap.

2. The dual-input power converter of claim 1, wherein the controller comprises:
    an error amplifier for comparing the output voltage with a reference voltage to produce an error signal;
    a first comparator for comparing the error signal with a first signal to determine a first PWM signal;
    a second comparator for comparing the error signal with a second signal to determine a second PWM signal; and
    a drive circuit for respectively switching the first high-side switch, the second high-side switch and the common low-side switch responsive to the first and second PWM signals.

3. The dual-input power converter of claim 2, wherein the drive circuit comprises a logical operation circuit for respectively establishing three control signals to switch the first high-side switch, the second high-side switch and the common low-side switch.

4. The dual-input power converter of claim 1, wherein the first power stage is a buck conversion circuit.

5. The dual-input power converter of claim 1, wherein the second power stage is a buck conversion circuit.

6. The dual-input power converter of claim 1, wherein the first input voltage is lower than the second input voltage.

7. The dual-input power converter of claim 6, further comprising a boost converter coupled between the first and second inputs for converting the first input voltage to the second input voltage.

8. The dual-input power converter of claim 1, wherein the first and second high-side switches are PMOS transistors.

9. The dual-input power converter of claim 8, wherein the PMOS transistors have respective substrate connections coupled to the second input voltage.

10. The dual-input power converter of claim 1, wherein the controller determines which of the first or second power stage to drive responsive to a value of the first input voltage.

11. The dual-input power converter of claim 1, further comprising an error amplifier for comparing the output voltage with a reference voltage and outputting a signal to the controller for determining which of the first or second power stages to drive responsive to a value of the output voltage.

12. A control method for a dual-input power converter configured with two power stages, each of the power stages having a respective high-side switch coupled to a common low-side switch for producing an output voltage, the control method comprising the steps of:
    providing a first input voltage coupled to the high-side switch of the first power stage;
    providing a second input voltage coupled to the high-side switch of the second power stage, the second input voltage being greater than the first input voltage;
    detecting a magnitude of the first input voltage; and
    selectively driving one of the two power stages in correspondence with the magnitude of the first input voltage, wherein the driving step includes:
    a. alternately driving the high-side switch of the first power stage and the common low-side switch for converting the first input voltage to the output voltage responsive to the magnitude of the first input voltage being at least equal to a threshold value; or,
    b. alternately driving the high-side switch of the second power stage and the common low-side switch for converting the second input voltage to the output voltage responsive to the magnitude of the first input voltage being less than the threshold value.

13. The control method of claim 12, further comprising the step of boosting the first input voltage for producing the second input voltage.

14. A control method for a dual-input power converter configured with two power stages, each of the power stages having a respective high-side switch coupled to a common low-side switch, a first input for coupling a first input voltage to the high-side switch of the first power stage, a second input for coupling a second input voltage to the high-side switch of the second power stage, and an output coupled to the first and second power stages for producing an output voltage, the control method comprising the steps of:

a. providing the second input voltage to have a different magnitude than the first input voltage;
b. comparing the output voltage with a reference voltage;
c. alternately driving the high-side switch of the first power stage and the common low-side switch for converting the first input voltage to the output voltage if the output voltage is at least equal to the reference voltage, the high-side switch of the first power stage and the common low-side switch being driven such that none of their on-duty cycles overlap; and
d. alternately driving the high-side switch of the second power stage and the common low-side switch for converting the second input voltage to the output voltage if the output voltage becomes less than the reference voltage in step b, the high-side switch of the first power stage, the high-side switch of the second power stage, and the common low-side switch each being driven such that none of their on-duty cycles overlap.

15. The control method of claim 14, further comprising the step of boosting the first input voltage for producing the second input voltage.

16. A control method for a dual-input power converter configured with two power stages, each of the power stages having a respective high-side switch coupled to a common low-side switch, a first input for coupling a first input voltage to the high-side switch of the first power stage, a second input for coupling a second input voltage to the high-side switch of the second power stage, and an output coupled to the first and second power stages for producing an output voltage, the control method comprising the steps of:

providing the second input voltage to have a different magnitude than the first input voltage;
detecting an on-duty time period of the high-side switch in the first power stage;
alternately driving the high-side switch of the first power stage and the common low-side switch for converting the first input voltage to the output voltage responsive to the on-duty time period being less than a threshold, the high-side switch of the first power stage and the common low-side switch being driven such that none of their on-duty cycles overlap; and
alternately driving the high-side switch of the second power stage for converting the second input voltage to the output voltage responsive to the on-duty time period being greater than the threshold one or more times, the high-side switch of the first power stage, the high-side switch of the second power stage, and the common low-side switch each being driven such that none of their on-duty cycles overlap.

17. The control method of claim 16, further comprising the step of boosting the first input voltage for producing the second input voltage.

18. A control method for a dual-input power converter configured with two power stages, each of the power stages having a respective high-side switch coupled to a common low-side switch, a first input for coupling a first input voltage to the high-side switch of the first power stage, a second input for coupling a second input voltage to the high-side switch of the second power stage, and an output coupled to the first and second power stages for producing an output voltage, the control method comprising the steps of:

providing the second input voltage to have a different magnitude than the first input voltage;
supplying a clock having a first time interval and a second time interval within each period;
driving the first power stage for converting the first input voltage to the output voltage during the first time interval, the high-side switch of the first power stage and the common low-side switch being alternately driven to an on-state during the first time interval; and
driving the second power stage for converting the second input voltage to the output voltage during the second time interval, the high-side switch of the second power stage and the common low-side switch being alternately driven to an on-state during the second time interval, the high-side switch of the first power stage, the high-side switch of the second power stage, and the common low-side switch each being driven such that none of their on-duty cycles overlap.

19. The control method of claim 18, further comprising the step of boosting the first input voltage for producing the second input voltage.

20. A dual-input power converter for producing an output voltage, comprising:

a first input coupled to a first input voltage;
a second input coupled to a second input voltage, the second input voltage having a different magnitude than the first input voltage;
a switching circuit including a diode coupled to a node, a first switch coupled between the first input and the node, and a second switch coupled between the second input and the node;
an inductor coupled between the node and an output terminal; and
a controller for operating the switching circuit to alternately drive the first switch on and off during a first time period to cause the inductor to generate the output voltage from the first input voltage and alternately drive the second switch on and off during a second time period to cause the inductor to generate the output voltage from the second input voltage, the diode having a polarity to be conductive when either of the first switch and the second switch is driven off, and the first and second time periods are non-overlapping.

21. The dual-input power converter of claim 20, wherein the controller comprises:

an error amplifier for comparing the output voltage with a reference voltage to produce an error signal;
a first comparator for comparing the error signal with a first signal to determine a first PWM signal;
a second comparator for comparing the error signal with a second signal to determine a second PWM signal; and
a drive circuit for respectively switching the first and second switches responsive to the first and second PWM signals.

22. The dual-input power converter of claim 20, wherein the first and second switches are PMOS transistors.

23. The dual-input power converter of claim 22, wherein the PMOS transistors have respective substrate connections coupled to the second input voltage.

24. A control method for a dual-input power converter having a first input coupled to a first input voltage, a second input coupled to a second input voltage, a switching circuit including a first switch coupled to the first input, a second switch coupled to the second input, and a third switch coupled between the first and second switches and a common reference for both the first and second input voltages, and an output for producing an output voltage, the control method comprising the steps of:

providing the second input voltage to have a different magnitude than the first input voltage;

comparing the output voltage with a reference voltage for producing an error signal;

comparing the error signal with a first signal for determining a first PWM signal;

comparing the error signal with a second signal for determining a second PWM signal; and operating the switching circuit to selectively drive one of the first, second and third switches responsive to the first and second PWM signals for selecting one of the first or second input voltages to convert to the output voltage, operating the switching circuit includes driving the third switch, the first switch, and the second switch such that none of their on-duty cycles overlap.

* * * * *